US010955831B2

(12) United States Patent
Carcano et al.

(10) Patent No.: US 10,955,831 B2
(45) Date of Patent: Mar. 23, 2021

(54) METHOD AND APPARATUS FOR DETECTING THE ANOMALIES OF AN INFRASTRUCTURE

(71) Applicant: Nozomi Networks Sagl, Mendrisio (CH)

(72) Inventors: Andrea Carcano, Varese (IT); Moreno Carullo, Gavirate (IT)

(73) Assignee: Nozomi Networks Sagl, Mendrisio (CH)

( * ) Notice: Subject to any disclaimer, the term of this patent is extended or adjusted under 35 U.S.C. 154(b) by 0 days.

(21) Appl. No.: 16/232,750

(22) Filed: Dec. 26, 2018

(65) Prior Publication Data
US 2020/0209837 A1 Jul. 2, 2020

(51) Int. Cl.
*G06F 16/904* (2019.01)
*G05B 19/418* (2006.01)

(52) U.S. Cl.
CPC ....... *G05B 19/4186* (2013.01); *G06F 16/904* (2019.01); *G05B 2219/25216* (2013.01)

(58) Field of Classification Search
CPC ....... H04L 45/02; H04L 45/70; H04L 47/122; H04L 47/365; H04L 63/104; H04L 63/1466; H04L 65/608; H04L 67/32; H04L 12/28; H04L 41/0604; H04L 41/0631; H04L 41/142; H04L 43/00; H04L 43/028; H04L 43/062; H04L 43/0852; H04L 43/0864; H04L 43/18; H04L 45/125; H04L 47/10; H04L 49/25; H04L 49/602; H04L 61/2015; H04L 61/6022; H04L 61/6063; H04L 63/02; H04L 63/0428; H04L 63/083; H04L 63/0853; H04L 63/18; H04L 63/30; H04L 65/102; H04L 65/1069; H04L 69/32; G06F 21/554; G06F 21/56; G06F 2009/45587; G06F 2009/45591; G06F 2009/45595; G06F 21/53; G06F 9/45558;
(Continued)

(56) References Cited

U.S. PATENT DOCUMENTS

2015/0358391 A1* 12/2015 Moon ................ G06F 11/34
709/224
2016/0212171 A1* 7/2016 Senanayake .......... G06F 3/0482
(Continued)

*Primary Examiner* — Djenane M Bayard
(74) *Attorney, Agent, or Firm* — Hill Wallack LLP; Jason L DeFrancesco (57) ABSTRACT

The present invention relates to a method for detecting anomalies in an infrastructure comprising the step of analyzing each of the data packets (PD) exchanged in the telecommunication system; identifying for each of the analysed data packets (PD) all the network protocols used and at least one field of each of the protocols; generating a virtual representation of the infrastructure (1) for each of the exchanged data packets (PD) and on the basis of the identified protocols and fields; storing the virtual representation generated for each of the exchanged data packets (PD); comparing the virtual representation stored with at least one comparison element, identifying at least one critical state of the infrastructure from the differences and/or similarities between the stored virtual representation and the comparison elements; signaling, by means of the computerized data processing means, an anomaly of the infrastructure when at least one of the critical states is identified in the virtual representation.

10 Claims, 5 Drawing Sheets

(58) Field of Classification Search
CPC .. G06F 21/566; G06F 2221/034; G06F 12/08; G06F 15/173; G06F 15/177; G06F 21/55; G06F 21/552; G06F 9/4843; G06F 9/45537; G06F 9/45533; G06F 11/3006; G06F 11/302; G06F 11/34; G06F 11/3409; G06F 11/3428; G06F 2201/805; G06F 2201/81; G06F 2201/86; G06F 2201/865; G06F 2201/875; G06F 2221/033; G06F 2221/2129; G06F 2221/2145; G06F 16/2379; G06F 16/24565; G06F 16/24568; G06F 16/2471; G06F 21/568; G06F 2221/2111; G06F 9/455; G06F 11/08; G06F 16/9024; G06F 21/00; G06F 21/561; G06F 2207/4824; G06F 7/544; G06F 7/5443; G06F 9/00; G06F 2221/214
See application file for complete search history.

(56) References Cited

U.S. PATENT DOCUMENTS

| | | | |
|---|---|---|---|
| 2017/0012941 A1* | 1/2017 | Subbarayan | H04L 67/02 |
| 2017/0295193 A1* | 10/2017 | Yang | H04L 63/1425 |
| 2018/0367414 A1* | 12/2018 | Raghavendra | H04L 41/22 |

* cited by examiner

METHOD AND APPARATUS FOR DETECTING THE ANOMALIES OF AN INFRASTRUCTURE

FIELD OF INVENTION

The present invention relates to the field of security methods and security systems in the management of infrastructures, in particular of physical infrastructures of industrial system, such as automation systems and industrial production systems. In particular, the present invention relates to a method for detecting the anomalies of an infrastructure.

In a further aspect, the present invention relates to an apparatus for detecting the anomalies of an infrastructure.

BACKGROUND ART

Industrial systems are defined by physical infrastructures provided with subsystems and components capable of physically interact with each other to obtain the functionalities required by the same industrial systems.

Systems of the aforesaid type are, for example, industrial systems for the manufacturing production, industrial systems for the generation of energy, infrastructures for the distribution of fluids (water, oil and gas), infrastructures for the generation and/or transmission of electric power and infrastructures for transport management.

The logical connection of the industrial system, or of the subsystems and components thereof, allows to obtain a so-called industrial automation system, wherein the control can be operated in correspondence of the subsystem or component to be controlled or rather remotely, i.e. at a distance within the area occupied by the system or even outside the same area.

The definition of an industrial automation system of the aforesaid type for a physical infrastructure exposes the same huge security problems, since the control of the industrial system can be susceptible to criminal activities. To protect the infrastructure, or the automation system that controls it, the so-called distributed control systems or SCADA are known in the field of automatic control. The acronym SCADA (Supervisory Control and Data Acquisition) is precisely related to a distributed system for the monitoring and supervision of physical systems, such as the aforementioned infrastructures or their subsets and components, provided with RTUs (Remote Terminal Units) allowing the interface of the aforesaid physical systems to the distributed control system or SCADA. The RTU monitors the digital and analogue field parameters and transmits the data to the central monitoring station, possibly with the possibility of piloting the physical systems, thus allowing the SCADA-type systems the supervision, control or remote control to limit the possibility of intrusion into the automation system of the infrastructure itself. Furthermore, SCADA-type systems allow monitoring the management of the anomalies of an infrastructure, by the logic control of its subsets and components.

A typical approach of the SCADA system involves the use of the "pull" model, wherein each RTU is configured with a remote access number and the SCADA system regularly performs the polling of the RTUs to obtain data in real time. Such approach presents some critical issues. Due to the nature of the polling process, the SCADA system must periodically query each RTU to recover the data, even if there are not exchanged ones, which could happen during the monitoring of small size resources.

Moreover, the need of having to provide an RTU for each of the components or physical subsystems to be controlled considerably increases the costs associated with the realization of a distributed control system. The aforementioned costs can quickly become exorbitant, especially if there are small or infrequent variations in the field measurements, or in the case of changes to the physical infrastructure, which must correspond to a change in the architecture of the distributed control system or of the RTUs. Likewise, computational costs can also become very demanding if are employed many RTUs to undergo polling.

It would therefore be desirable to have a method capable of limiting the management costs in a distributed control system. Furthermore, it would be desirable to have a method capable of maximizing the management capacity depending on the physical architecture to be controlled and its changes over time. Finally, it would be desirable to have a method capable of an effective control of the physical architecture capable of preventing anomalous management situations connected to random failures, or generated by an unwanted intrusion, of the physical architecture.

Likewise, it would be desirable to have an apparatus capable of defining a distributed control system for a physical architecture with low running costs even in the presence of complex physical architectures or subject to frequent changes.

SUMMARY OF THE INVENTION

The object of the present invention is to provide a method for detecting anomalies in a physical infrastructure capable of minimizing the aforementioned drawbacks, in particular of an infrastructure provided with:
- one or more actuators and/or sensors electrically connected to one or more logic controllers, wherein the logic controllers control, in use, the values of the variable attributes relating to the physical state of the actuators and/or sensors;
- at least one supervision unit of the logic controllers;
- a telecommunication system between the logic controllers and/or between the supervision unit and the logic controllers, wherein the telecommunication system being able to exchange data packets comprising the values of the variable attributes relating to the physical state by means of network communication protocols.

According to the present invention is described, therefore, a method for detecting anomalies of an infrastructure comprising the steps of:
- analysing, by means of a network analyser connected to the telecommunication system, each of the data packets exchanged in the telecommunication system;
- identifying, by means of the network analyser, for each of the analysed data packets all the network protocols used and at least one field of each of the protocols;
- generating, through computerized data processing means, a virtual representation of the infrastructure for each of the exchanged data packets and on the basis of the identified protocols and fields;
- storing, in first volatile storage means, the virtual representation generated for each of the exchanged data packets;
- comparing, by means of computerized data processing means, the virtual representation stored with at least one comparison element, identifying at least one critical state of the infrastructure from the differences and/or similarities between the stored virtual representation and the comparison elements;

signaling, by means of computerized data processing means, an anomaly of the infrastructure when at least one of the critical states is identified in the virtual representation.

The method according to the present invention therefore allows to generate a virtual representation whenever a data packet is exchanged for the monitored infrastructure. The method presents a "push" type logic, wherein the virtual representation is generated by the exchanged data packet, i.e. a virtual representation of the infrastructure is not generated if there is no data packet exchanged in the telecommunication system. This allows to minimize the computational costs related to the analysis of the physical infrastructure.

Preferably, all the network protocols used and all the fields of each of the protocols are identified in the identification step.

In this way, it is possible to define the critical states relating to any protocol or protocol field not consistent with the allowed virtual representations.

Preferably, the comparison elements comprise one or more allowed predefined representations of the infrastructure, and wherein the comparison step identifies at least one of the critical states when the stored virtual representation is different from the allowed predefined representations.

Preferably, the comparison elements comprise one or more thresholds of the values of the variable attributes relating to the physical state of the actuators and/or sensors, and wherein the comparison step identifies at least one of the critical states when at least one of the values of the stored virtual representation exceeds the relative threshold.

Preferably, the comparison elements comprise one or more communication protocols not allowed for the network communication, and wherein the comparison step identifies at least one of the critical states when the stored virtual representation comprises one or more communication protocols not allowed for the network communication.

Preferably, the comparison elements comprise one or more fields not allowed for the communication protocols, and wherein the comparison step identifies at least one of the critical states when the stored virtual representation comprises one or more of the fields not allowed for the communication protocols.

By defining the allowed predefined representations, one or more thresholds of the values of the variable attributes, one or more communication protocols not allowed and/or one or more fields not allowed for the protocols, it is possible to define a complete control of the infrastructure to be monitored which takes in account a wide possibility of generation of critical states.

Preferably, the comparison step further comprises the comparison of two or more of the virtual representations generated in succession, and wherein the comparison step identifies at least one critical state of the infrastructure in the differences between subsequent virtual representations and the comparison elements.

In this way, it is possible to identify a critical state from the differences and/or similarities contained in two or more subsequent virtual representations, thus allowing the generation of a possible critical state based on the evolution of the states of the infrastructure to be controlled.

Preferably, the comparison elements comprise threshold values of the communication frequencies between two or more of the subsequent virtual representations, and wherein the comparison step further comprises comparing two or more of the virtual representations generated in succession identifying the communication frequency between the logic controllers and/or between the logic controllers and the sensors or actuators and/or between the logic controllers and the supervision unit, and wherein the critical states are identified by threshold values for the communication frequencies.

Thus, a critical state could be generated, for example, by the querying frequency of a controller or by the change frequency of the variable attribute of a sensor and/or actuator.

Preferably, the method further comprises the step of comparing two or more of the virtual representations generated in succession and identifying one or more communication sequences between the logic controllers and/or between the logic controllers and the supervision unit and/or between the logic controllers and the sensors or actuators, and wherein the critical states comprise non-allowable communication sequences.

In this way, it is possible to identify a critical state from the differences and/or similarities contained in two or more subsequent virtual representations, thus allowing the generation of a possible critical state based on the sequencing of the data packets transited within the telecommunication system of the infrastructure.

Preferably, before the comparison step, the method comprises the step of defining the critical states, wherein the step of defining the critical states comprising the steps of:
analysing, by means of the network analyser connected to the telecommunication system, each of the data packets exchanged in a predetermined time interval;
identifying, by means of the network analyser, for each of the analysed data packet, the network protocols used and at least one field of the protocols;
generating, through the computerized data processing means, an aggregate virtual representation of the infrastructure in the predetermined time interval based on the protocols and fields of the protocols identified with each exchanged data packet;
storing, in second storage means of the permanent type, the aggregate virtual representation;
identifying critical states as virtual representations not comprised in the aggregate virtual representation.

Such step of defining critical states corresponds to a learning step in which it is possible to automatically learn the allowed virtual representations and, therefore, to identify any critical states from virtual representations not generated during the aforementioned learning step.

Preferably, all the network protocols used and all the fields of each of the protocols are identified in the identification step.

Preferably, the method further comprises the step of defining risk values for each of the sensors and/or actuators and/or supervision unit and/or value and/or communication protocol and/or protocol field, the risk values being stored on the first or second storage means, wherein the step of generating the virtual representations comprises the further step of associating the risk values to each of the virtual representations, generating a virtual representation of risk.

The calculation of risk values allows identifying the most critical components and therefore generating a risk status or, on the contrary, not to classify a risk status according to the risk value associated with each of the sensors and/or actuators and/or supervision unit and/or value and/or communication protocol and/or protocol field.

Preferably, the method further comprises the step of automatically calculating the risk values, by means of computerized data processing means, on the basis of the communication frequency between the industrial components and/or between the supervision units and/or between the industrial components and the supervision units and/or based on the value of the variable attributes and/or protocol used and/or protocol attributes identified by said network analyser.

The calculation of the risk values can be further carried out according to the communication frequency, thus identifying as elements of greater risk value those subject to a greater communication frequency.

Preferably, the data packets comprise at least one protocol field relating to the sender address and at least one protocol field relating to the recipient address, and wherein the virtual representation generated for each of the analysed data packets is obtained by defining the fields related to the addresses as nodes, the connections between the sender and the recipient as arcs and the remaining fields extracted from the data packets as values of the nodes and arcs.

The aforementioned object is further achieved by an apparatus for detecting anomalies in an infrastructure provided with:
one or more actuators and/or sensors operatively connected to one or more logic controllers, wherein the logic controllers control, in use, values of the variable attributes relating to the physical state of the actuators and/or sensors;
at least one supervision unit of the logic controllers;
a telecommunication system between the logic controllers and/or the supervision unit and the logic controllers, wherein the telecommunication system being able to exchange data packets comprising the values of the variable attributes of the physical state by means of network communication protocols.

According to the present invention is described, therefore, an apparatus for detecting anomalies of an infrastructure comprising:
a network analyser able to be connected to the telecommunication system, wherein the network analyser is able to analyse each of the data packets exchanged in the telecommunication system and to identify the network protocol used for each of the data packets and at least one protocol field;
computerized data processing means operatively connected to the network analyser, wherein the computerized data processing means being able to generate a virtual representation of the infrastructure on the basis of the protocols and fields of the protocols identified by the network analyser to each exchanged data packet;
first volatile storage means operatively connected to the computerized means, wherein the first storage means storing the virtual representation generated for each exchanged data packet;
second permanent storage means operatively connected to the computerized means, wherein the second storage means comprising in their memory one or more comparison elements;
wherein the computerized data processing means, in use, compare the virtual representation with at least one of the comparison elements, and wherein the computerized data processing means identify and signal at least one critical state of the infrastructure from the differences and/or similarities between the stored virtual representation and the comparison elements.

As previously described for the method, the apparatus according to the present invention therefore allows to generate a virtual representation whenever a data packet is exchanged for the monitored infrastructure. The apparatus operates with a "push" type logic, wherein the virtual representation is generated by the exchanged data packet, i.e. a virtual representation of the infrastructure is not generated if there is no data packet exchanged in the telecommunication system. This allows to minimize the computational costs related to the analysis of the physical infrastructure.

Preferably, the computerized data processing means, in use, compare two or more subsequent virtual representations,
wherein the computerized data processing means identify and signal at least one critical state of the infrastructure in the differences between the subsequent virtual representations and the comparison elements.

Preferably, the network analyser is adapted to identify the communication frequency between the logic controllers and/or between the logic controllers and the sensors or actuators and/or between the logic controllers and the supervision unit,
wherein the comparison elements comprise threshold values for the communication frequencies, and
wherein the computerized data processing means identify at least one of the critical states when at least one threshold value of the detected communication frequencies is exceeded.

Preferably, the computerized data processing means, in use, compare two or more of the virtual representations generated in succession and identify one or more communication sequences between the logic controllers and/or between the logic controllers and the supervision unit and/or between the logic controllers and the sensors or actuators,
wherein the comparison elements comprise non-allowable communication sequences, and
wherein the computerized data processing means identifies at least one of the critical states when at least one identified communication sequence corresponds to a non-allowable communication sequence.

DESCRIPTION OF THE FIGURES

These and further features and advantages of the present invention will become apparent from the disclosure of the preferred embodiment, illustrated by way of a non-limiting example in the accompanying figures, wherein.

DETAILED DESCRIPTION OF THE INVENTION

The present invention relates to a method for detecting anomalies in an infrastructure, in particular a physical infrastructure. The present invention is further related to an apparatus for detecting the anomalies of an infrastructure.

The method and the apparatus according to the present invention find useful application in physical infrastructures or automation systems, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. The aforementioned automation systems or physical infrastructures employ processes that operate on physical components that interact with each other or through appropriate logic controllers for managing the respective physical state. In particular, the management of the physical state comprises both monitoring, that is the verification and surveillance of the physical state for the purpose of observation, and regulating of the physical component, in order to modify and/or set the value of the variable attributes relatively to the specific requests.

The term "physical component" means, in the present invention, a component that physically interacts within the automation system, or a general infrastructure, and identifies, in particular, two main types of components such as the sensors and the actuators. The physical components allow the detection and/or control of a physical performance with usually a result of the analogue type. In particular, the sensors are devices capable of detecting a magnitude, interacting with it. Depending on the acquired magnitude, the sensors can be related, for example, to chemical, physical and image magnitudes. The magnitude measured by the sensors are subsequently typically converted to electrical signals of the analogue type which are in turn sent to data acquisition systems. Actuators, on the other hand, are devices which have the task of realizing the command provided by the control system and it is possible to identify, for example, mechanical, electric, hydraulic or pneumatic actuators.

Figure 1:
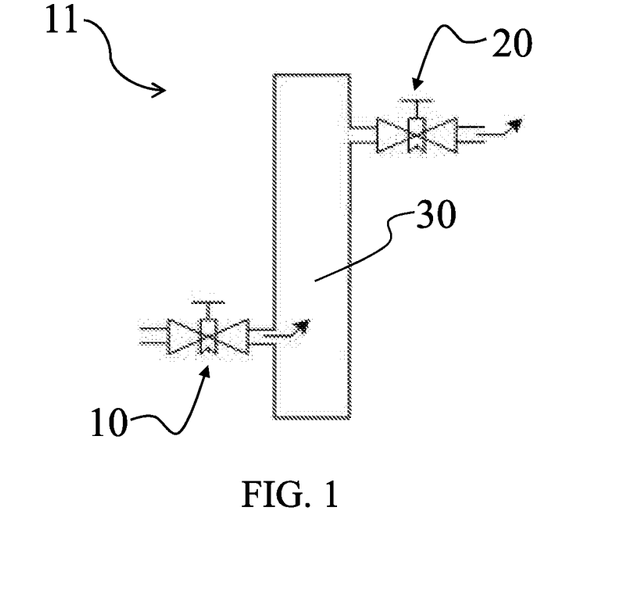
FIG. 1 shows a schematic view of an infrastructure constituted by the physical architecture of an industrial system for the distribution of pressurized fluid.

The following description will refer to the method and the apparatus according to the present invention when interacting with a physical infrastructure exemplified for convenience of description, but any type of physical infrastructure may be equally employed. In particular, FIG. 1 illustrates an infrastructure 1 consisting of the physical architecture 11 of an industrial system for distributing pressurized fluid, in particular steam. By way of example, such physical architecture 11 is defined by some elements, i.e. physical components, connected to each other and sufficient to allow the invention to be fully described. Such elements comprise a duct 30 in which the steam flows in a closed circuit from a single inlet to a single outlet. The fluid control is entrusted to two actuators 10, 20 in the form of solenoid valves connected in fluid communication to the duct 30. The solenoid valves 10, 20 are arranged, respectively, in correspondence of the inlet and the outlet of the duct 30, defining an input actuator 10, which intercepts and regulates the introduction of steam into the duct 30, and an output actuator 20, which intercepts and regulates the outflow of the steam from the same duct 30, respectively.

The physical state of each solenoid valve or actuator 10, 20 is defined by a variable attribute relative to the detectable or manageable physical magnitude. In particular, such variable attribute corresponds to the section of the fluid passage through the solenoid valves 10, 20, a variable attribute which is intrinsically related to the pressure guaranteed by the same solenoid valves 10, 20. In the embodiment described therein, such variable attribute may vary between the value "0", corresponding to the complete closure of the passage section of the solenoid valve, i.e. zero pressure, and the value "100", corresponding to the complete opening of the passage section of the solenoid valve, i.e. maximum pressure. The distribution of the values of the variable attribute of physical state for said solenoid valves 10, 20 is of the linear type, i.e. at the value "50" corresponds a passage section equal to half of the passage section corresponding to the total opening.

In the example shown, the physical architecture 11 comprises only actuators but could equally be provided also or exclusively with appropriate sensors. Similarly, the infrastructure could consist of a single component, be it a sensor or an actuator.

Figure 2:
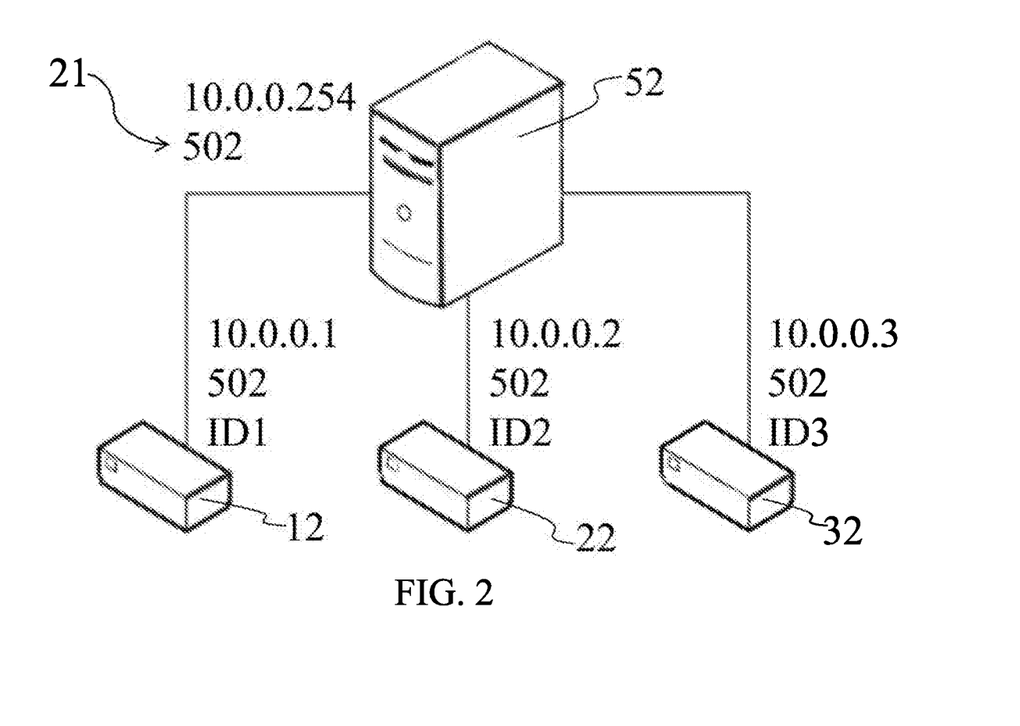
FIG. 2 shows a schematic view of the electrical/electronic architecture for the control of the physical architecture of the infrastructure of FIG. 1.

The physical architecture 11 of the infrastructure 1 is assisted by an electrical/electronic architecture 21, shown in FIG. 2, which allows the management of the aforementioned physical states in terms of monitoring and controlling the same. The electrical/electronic architecture 21 is an architecture of the distributed control type, preferably SCADA but could equally be realized by means of different type of industrial architectures or non-industrial architectures that can al low the management of the physical architecture 11 of the infrastructure. The electrical/electronic architecture 21 consists of a distributed computer system for the electronic monitoring of the infrastructure. Thus, the infrastructure 1 is provided with at least one logic controllers supervision unit. In particular, the electrical/electronic architecture 21 comprises, therefore, three logic controllers 12, 22, 32 operatively connected to a supervision unit 52, for example a Master Terminal Unit (MTU). Examples of the aforementioned logic controllers may be Remote Terminal Units (RTUs) or Programmable Logic Controllers (PLCs). In the embodiment described therein, the logic controllers used are of the industrial PLC type, such as for example commercial PLCs produced by the ABB company, model AC800.

Figure 3:
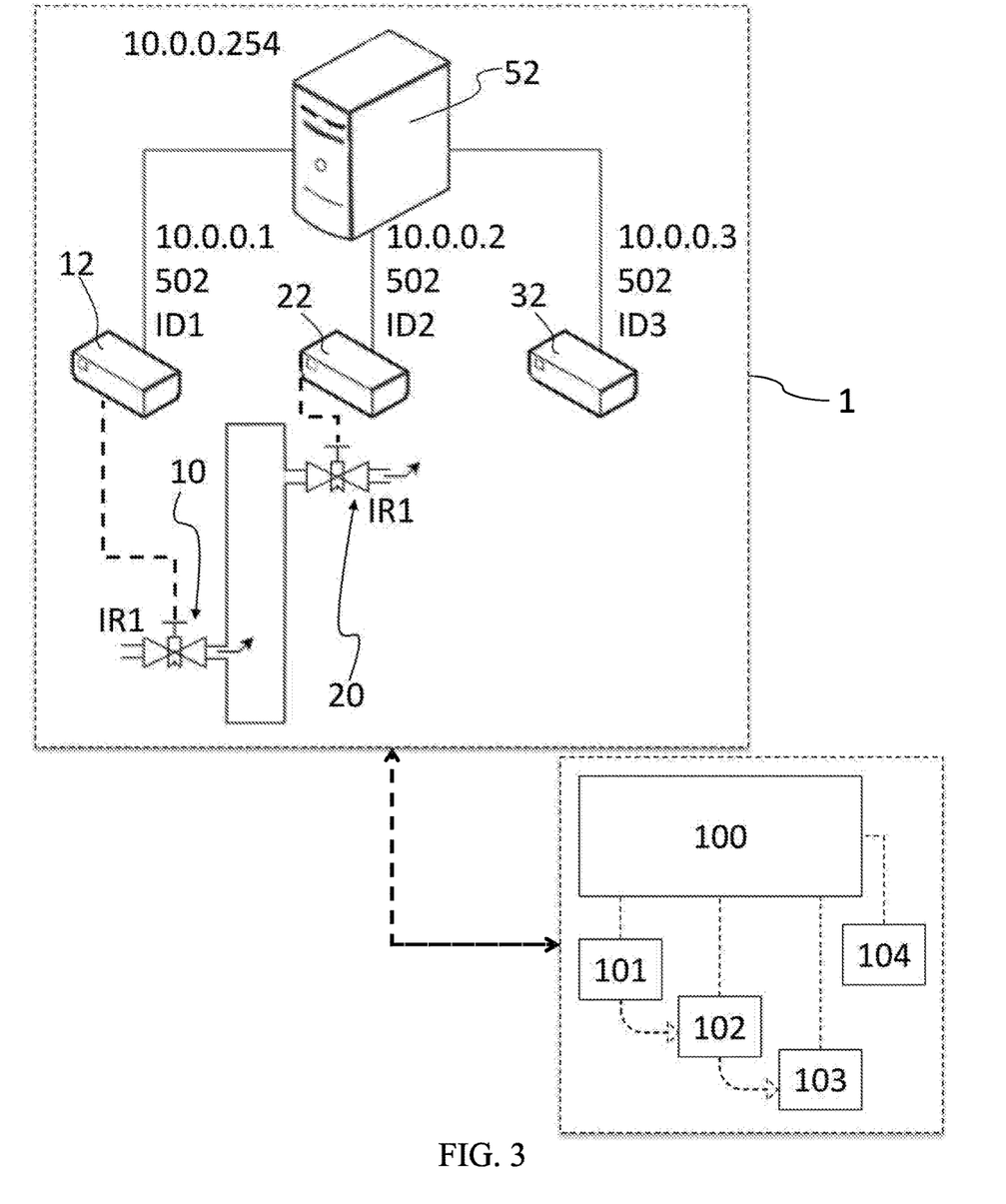
FIG. 3 shows a schematic view of the apparatus for detecting the anomalies of the infrastructure of FIGS. 1 and 2, according to the present invention.

As illustrated in FIG. 3, each of the two solenoid valves 10, 20 is operatively connected to a different logic controller and, in particular, the input solenoid valve 10 is electrically connected to the PLC 12, while the output solenoid valve 20 is electrically connected to the PLC 22. The PLC 32, on the other hand, is not connected to any of the solenoid valves 10, 20 of the physical architecture 11. Each logic controller 12, 22 operatively connected to the respective solenoid valve 10, 20 therefore controls the values of the variable attributes relating to the physical state of the aforesaid solenoid valves 10, 20, as previously described. Therefore, the actuators and/or sensors, defined in such case by the solenoid valves 10, 20, are operatively connected to one or more logic controllers, in such case defined by the PLCs 12, 22, which control, in use, the values of the variable attributes relating to the physical state of the same actuators and/or sensors.

With the term "control" is intended, in the present invention and in relation to the variable attributes, both the monitoring and the management of the same variable attributes.

In particular, each logic controller 12, 22 provides for converting the measurement, deriving from the monitoring, or the setting, relative to the management, of the analogue type of the solenoid valve 10, 20, or actuator, in a corresponding electrical measurement and, subsequently, preferably in a digital data.

The three logic controllers 12, 22, 32 and the supervision unit 52 are connected by means of a telecommunication system (partially exemplified with the solid and dashed lines connecting each component in FIGS. 2 and 3) which exploits network connections of the known type by means of network communication protocols also of the known type and which therefore will not be described any further. In the embodiment described, the telecommunication system consists of a local network of the ethernet type which physically connects each logic controller 12, 22, 32 to the supervision unit 52 but does not directly connect the same controllers 12, 22, 32 to each other. The telecommunication system could also connect the aforementioned logic controllers to each other or hierarchically connect multiple logic controllers. Said telecommunication system is therefore suitable for exchanging data packets PD comprising the values of the physical state variable attributes by means of the aforesaid network communication protocols.

Figure 4:
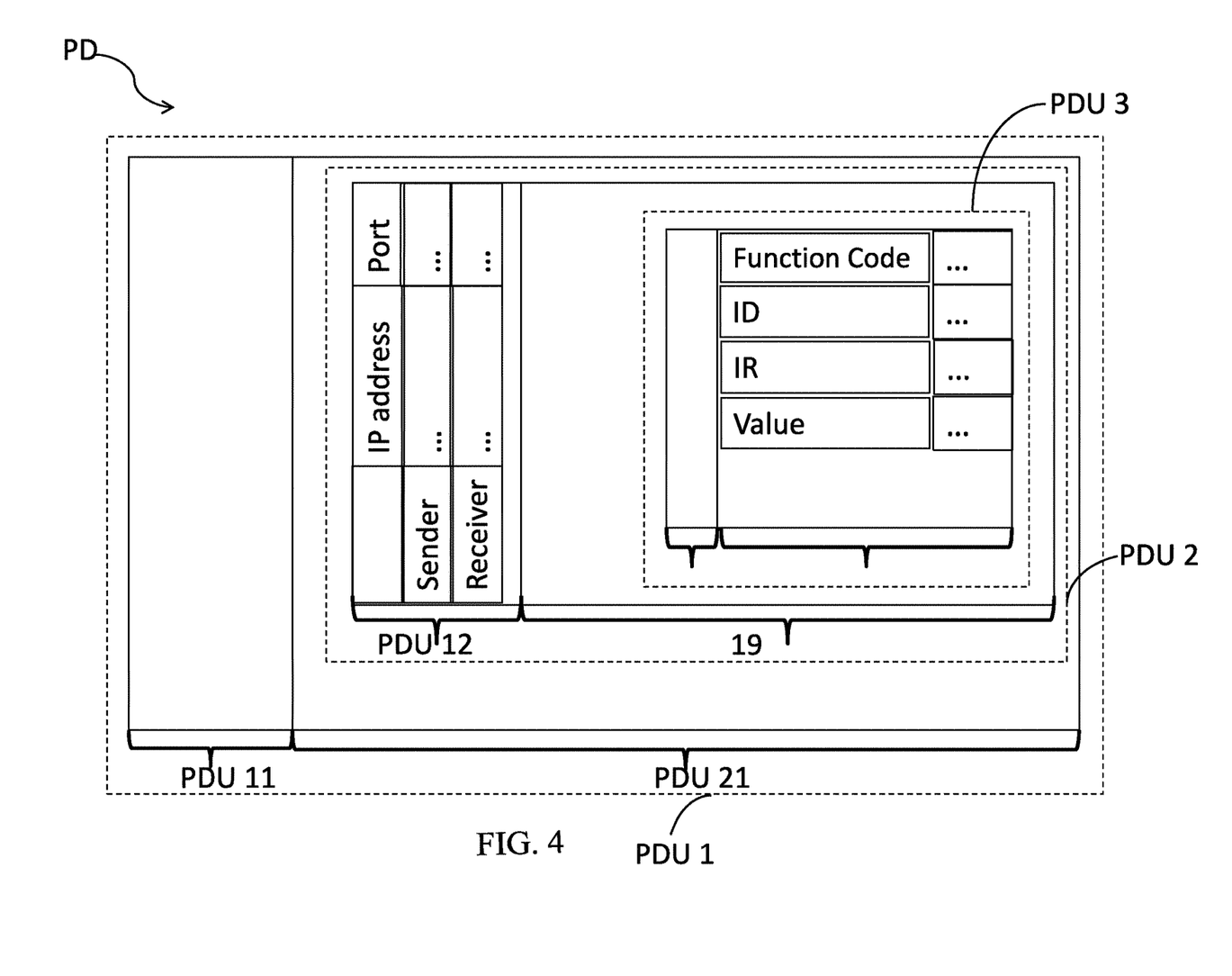
FIG. 4 shows a schematic view of the scheme of the protocols used in the electric/electronic architecture of FIG. 2.

Therefore, in the infrastructure 1, each of the logic controllers 12, 22 controls the relative solenoid valve 10, 20 to which it is electrically connected while the supervision unit 52 communicates directly with the controllers 12, 22 to indirectly control the aforementioned solenoid valves 10, 20. In particular, the supervision unit 52 sends and receives data packets PD (as illustrated in FIG. 4) to/from the logical controllers 12, 22, 32, which data packets PD are defined by multiple protocols and related encapsulated data, as described in the following.

By the term "data packet" is intended, in the present invention, each finite and distinct sequence of data transmitted by the telecommunication system. Preferably, these data are in digital format and defined by a sequence of bits. In particular, according to the present invention, each individual data packet comprises a plurality of Protocol Data Units (PDU), one for each architectural layer in which it is generated. Depending on the type of communication protocol and the transmission system used in the telecommunication system, each PDU will be different but, in any case, it comprises at least one header and the data body to be transmitted. The header contains all the information necessary for transmission, including, in particular, the transmitter address and the receiver address. Each data packet PD provides identifying mechanisms that uniquely distinguish it from the other packets of the data stream exchanged from a source device to a recipient device.

In multi-level networks, as in the present invention, in data packets PD generated by the transmitter the PDUs of the upper levels are inserted, or encapsulated, in the PDU of the lower levels. Similarly, the data packets received by the receiver first analyse the PDUs of the lower levels to access the PDUs of the upper levels inserted within the lower levels, until the value of the variable attribute of the sensor and/or physical actuator is identified.

The communication protocols used in the present embodiment are subdivided, with reference to each level of the ISO/OSI stack, in Ethernet or 802.11 protocol for the physical, connection and network levels, TCP/IP protocol for the transport and session levels, Modbus protocol for presentation and application levels.

The infrastructure 1 according to what previously described presents, therefore, four communication nodes consisting of the logic controllers 12, 22, 32 and the supervision unit 52. A unique address and a communication port that allow communication via the telecommunication system are assigned to each of the nodes, e.g. to each device. As shown in FIGS. 2 and 3, the logic controllers 12, 22, 32 and the supervision unit 52 correspond to the IP addresses 10.0.0.1, 10.0.0.2, 10.0.0.3 and 10.0.0.254 respectively. The communication port is the same for all connected devices and corresponds to the TCP port 502. The logic controllers 12, 22, 32 are also provided with a unique identifier, ID1, ID2 and ID3 respectively.

The operation of the anomaly detection apparatus 100 according to the anomaly detection method according to the present invention, during the normal operation of the infrastructure 1 to which it is connected, is illustrated below. In particular, the operation of the apparatus 100 is illustrated, and the application of the method, according to the present invention when the admissible representations have been previously defined and memorized within the second storage means 104, described in greater detail below, and during the execution of a simplified work cycle of the infrastructure 1 to which the apparatus 100 is connected. All the components of the infrastructure 1, according to the present invention, are network connected using the Modbus communication protocol. This allows the supervision unit 52 to be connected to the various acquisition and setting systems of the components of the infrastructure 1, that is to say the actuators 10, 20. In particular, the communication via the Modbus protocol is performed by exchanging data packets PD over TCP/IP from the various PLCs 12, 22, 32 to the supervision unit 52 and vice versa.

In different embodiments, different communication protocols may also be used or serial connections may be used instead of ethernet connections.

With reference to the infrastructure 1, it is assumed that the pressure within the duct 30 should be maintained monitored, where it is preferable that the pipeline loses pressure rather than increasing it to guarantee a safety condition. Such an acceptable representation for the physical infrastructure is related to the setting of the opening of the output solenoid valve 20 to values of the "value" field always higher, or at most equal, to the corresponding values set for the input solenoid valve 10. Therefore, assuming an initial situation in which the infrastructure 1 presents the input solenoid valve with value of the "value" field set at 10 and the corresponding value of the output solenoid valve 20 set to 15, is a safe representation the setting of the value "value" to 20 of the output solenoid valve 20.

The monitoring and detecting of possible anomalies during the operation of the infrastructure 1 are obtained by means of an anomaly detection apparatus 100, according to the present invention. Such apparatus 100 is schematized with a block representation in FIG. 3 where the connection to the remaining part of the infrastructure 1 is schematized by a dotted connection. The aforementioned apparatus 100 is preferably of the passive type, i.e. it monitors the entire infrastructure 1 without being actively connected to the same. In the described embodiment, the apparatus 100 is arranged in the telecommunication system between the supervision unit 52 and logic controllers 12, 22, 32. According to further embodiments, not shown, the anomaly detection apparatus according to the present invention can be connected to a suitable mirroring port of a router or a switch connecting the supervision unit to the logic controllers.

The apparatus 100 comprises multiple components, which are also shown schematically in blocks in FIG. 3, suitable for interacting with the infrastructure 1 and detecting any possible anomalies thereof. In particular, the apparatus 100 comprises a network analyser 101 connectable to the telecommunication system, computerized data processing means 102 connected to the aforementioned network analyser 101, first storage means 103 of the volatile type and second storage means 104 of the permanent type, operatively connected to the computerized data processing means 102.

The network analyser 101 which is part of the apparatus 100, is connected to the infrastructure 1 and passively interacts with the telecommunication system. The aforementioned network analyser 101 is able to analyse each of the data packets PT) exchanged in the telecommunication system and to identify the network protocol for each of the data packets and at least one field of the protocol. In particular, in the present embodiment, the network analyser 101 is able to intercept each data packet PD exchanged between the supervision unit 52 and the logic controllers 12, 22, 32 connected thereto.

In alternative embodiments, not shown, wherein the individual logic controllers are mutually connected in the same telecommunication system, the network analyser is therefore able to intercept also each data packet exchanged between the same controllers.

The anomaly detection method, according to the present invention, therefore, comprises the step of analysing, by means of the network analyser 101 connected to the telecommunication system, each of the data packets PD exchanged in the aforesaid telecommunication system.

For each of the analysed data packets PD, the next step of identifying all the network protocols used and at least one field of each of the protocols is implemented by the same network analyser 101.

The network analyser 101 thus enables to carry out the passive interception activity of the entire infrastructure network 1. In particular, the aforementioned analyser 101 is able to identify for each packet data PD exchanged through the telecommunication system of the infrastructure 1, the network protocol used and at least one field for each of the protocols. Preferably, the analyser 101 identifies at least the field relative to the value of the variable attribute which characterizes the physical state of each component, as previously described. In particular, in the present embodiment, in the identification step the network analyser 101 thus identifies all the network protocols used and all the fields of each of the protocols, so as to extract all the data concerning the infrastructure 1.

An exemplary representation of a data packet PD analysed and identified according to the present invention is illustrated in FIG. 4, where the above protocols scheme used in the description of the present invention and the encapsulation thereof are shown, by way of example. In this representation, the portion of the outermost data packet PD is relative to the PDU1 level of the physical protocol, provided with a PDU11 header portion and a PDU21 data portion, both non-detailed. The PDU21 portion encapsulates the portion of the data packet PD relative to the PDU2 level of the TCP/IP protocol. This is also provided with a PDU12 header portion and a PDU22 data portion and, in particular, the header portion PDU12 includes the identification data of the sender and the receiver in the form of an IP address and the corresponding port for communication. Finally, the portion of the data packet PD relative to the Modbus PDU3 level is encapsulated within the PDU22 portion of TCP/IP protocol data. In particular, the portion of packet PDU3 comprises at least the fields relating to: type of communication in terms of action to be performed, identified by "function code" which can assume the value "write" or "read" according to the command to be given, the identifier of the logic controller for which the data packet is intended, identified by "ID", the identifier of the actuator or sensor for which the action is to be carried out, identified by "IR", and the value of the variable attribute to be assigned to the physical state of the actuator or sensor if the "function code" is in "write" mode, identified by the "value" attribute.

Figure 5A:
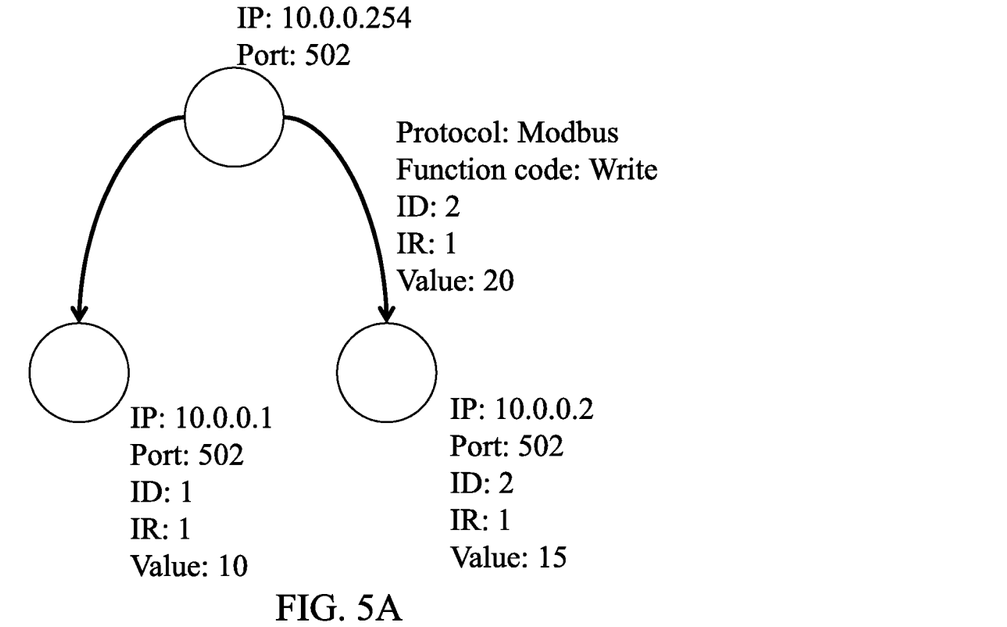
FIG. 5A shows a schematic view of an allowable virtual representation of the infrastructure shown in FIGS. 1 and 2.
Figure 5B:
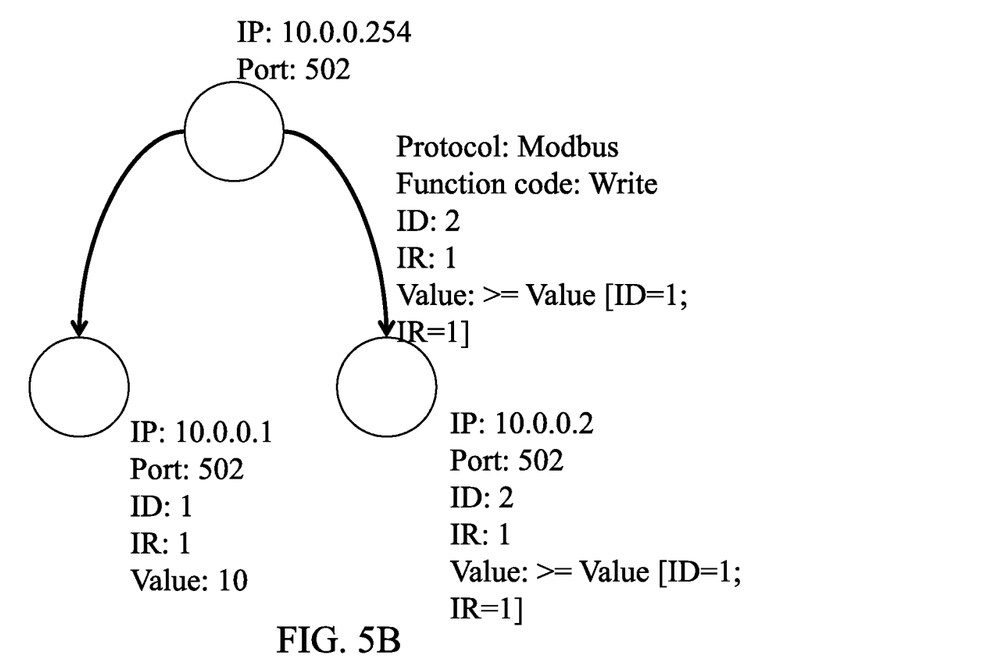
FIG. 5B shows a schematic view of a plurality of allowable virtual representations of the infrastructure illustrated in FIGS. 1 and 2.

Therefore, in the embodiment illustrated in FIGS. 5A and 5B, the input solenoid valve 10, electrically connected to the logic controller 12, assumes a specific identifier (of actuator) defined by an IR equal to 1. In the same way, the output solenoid valve 20 assumes a specific identifier (of actuator) defined by an IR equal to 2. For example, to command the reading of the value of the attribute relative to the physical state of the input solenoid valve 10, the supervision unit 52 must send a data packet PD in which the PDU of the Modbus protocol contains the value "read" in the field "function code", the value 1 in the ID field and the value 1 in the IR field. In a further example, the reading command of the attribute relative to the physical state of the output solenoid valve 20 will be realized by a packet data PD in which the PDU of the Modbus protocol contains the value "read" in the field "function code", the value 2 in the ID field and the value 1 in the IR field.

The present invention also includes the use of transmission architectures and related protocols different from those previously described with respect to the illustrated embodiment.

The anomaly detection apparatus 100 is further provided with suitable computerized data processing means 102, operatively connected to the network analyser 101. Such data processing means 102 enable processing of the data intercepted in the telecommunication system by the network analyser 101.

Thus, through the computerized data processing means 102, the subsequent step of generating a virtual representation of the infrastructure 1 is realized for each of the exchanged data packets PD and on the basis of the identified protocols and fields.

In particular, the term "virtual representation" means, in the present invention, the representation of the nodes and arcs defined by each packet data PD exchanged in the telecommunication system. In particular, each data packet comprises at least one protocol field relating to the sender address and at least one protocol field relating to the recipient address. The virtual representation generated for each of the analysed data packets PD is obtained by defining as nodes the fields of the data packet protocols related to the (unique) identifier of the sender or recipient of the communication or relative to the addresses, such fields being preferably relative to the address IP or to the MAC Address in the TCP/IP protocol. Accordingly, each arc is determined by the connection between the sender and the recipient within a single data packet PD, the arc being oriented from the sender to the recipient. The virtual representation is completed with the information related to all the attributes of each field of all the protocols constituting the data packet PD exchanged and defining the values of each arc and of each node. The term "virtual representation" can, therefore, refer to both the graphic representation and the mere management of the data underlying the aforementioned graphical representation without any generation of a graphical interface.

In the previous example of the first command, the relative data packet PD defines a node with the IP address of the supervision unit 52 and a further node with the IP address of the logical controller 12 for which the communication is intended. From the same communication it is possible, therefore, to extrapolate the arc connecting the two nodes, which orientation is directed by the supervision unit 52 to the logical controller 12. Moreover, from the extraction of the protocols fields constituting the data packet PD it is possible to assign appropriate values to the nodes, for example the TCP connection port, corresponding to the value 502 for both the nodes, as well as ID and IR both equal to the value 1 for the node corresponding to the logic controller 12 when connected to the input solenoid valve 10. The additional fields will define the values relative to the generated arc and, in particular, in the case of the first command these will correspond to the read value of the function code field, while the value field will be absent.

Likewise, in the previous example of the second command, the relative data packet PD defines a node with the IP address of the supervision unit 52 and a further node with the IP address of the logical controller 22 for which the communication is intended. From the same communication it is possible, therefore, to extrapolate the arc connecting the two nodes, which orientation is directed by the supervision unit 52 to the logical controller 22. Moreover, as in the previous example, from the extraction of the protocols fields constituting the data packet PD it is possible to assign appropriate values to the nodes, for example the TCP connection port, corresponding to the value 502 for both the nodes, as well as ID and IR, equal to the values 1 and 2 respectively for the node corresponding to the logic controller 22 when connected to the output solenoid valve 20. Further, as in the previous example, the additional fields will define the values relating to the generated arc and, in particular, the read value of the function code field, while the value field will be absent.

The network analyser 101 then analyses each data packet PD exchanged via the telecommunication system. The analysis of the data packets PD is carried out in push mode, that is, it is carried out whenever a communication occurs regardless of the time intervals between the same communications.

The subsequent step of storing the virtual representation generated for each of the exchanged data packets PD is carried out by first storage means 103 of the volatile type. Each virtual representation generated for each intercepted data packet PD is in fact memorized by means of suitable first storage means 103 of the apparatus 100 and operatively connected to the aforementioned computerized means 102. These are preferably of the volatile type, i.e. non-permanent storage.

Additional second storage means 104, of the permanent type, form part of the apparatus 100 and allow the storage of one or more comparison elements, defined as such since they allow to compare the virtual representations generated to signal possible anomalies of the infrastructure 1.

In this regard, by means of computerized data processing means 102, it is also provided the step of comparing the virtual representation stored with at least one comparison element identifying one critical state of the infrastructure 1 in function of the differences and/or similarities between the generated and stored virtual representation and appropriate comparison elements.

Preferably, the comparison elements comprise one or more allowed predefined representations of the infrastructure 1. In the comparison step, then, it is identified at least one of the critical states when the stored virtual representation is different from the allowed predefined representations. An example of an allowed predefined representation is illustrated in FIG. 5A, defined as a complex type, albeit with few variables, since the allowable representation comprises a plurality of fields and variable attributes, in particular relating to the input solenoid valve 10 as well as to the output solenoid valve 20 and to the related logic controllers 12, 22 and to the supervision unit 52.

The comparison elements can also be constituted by one or more thresholds of the values of the variable attributes related to the physical state of the actuators and/or sensors, for example the value of the "value" field of the output solenoid valve 20 can have a threshold value equal to or greater than that of the input solenoid valve 10, by synthesizing in a single representation multiple allowable predefined representations as illustrated in FIG. 5B characterized by setting the value of the "value" attribute of the output solenoid valve 20 to a value larger than or equal to the corresponding value of the input solenoid valve 10. In the same way, one or more communication protocols not allowed for network communication or one or more fields not allowed for communication protocols can define comparison elements with which highlight critical issues.

Further allowable representations can be of the simple type (not shown), i.e. determined by the variation of a single variable attribute regardless of the variation of the additional variable attributes Characterizing the communication. An example of an allowed predefined representation, according to the aforementioned hypotheses, could be related to the setting at a value equal to 100 of the "value" field of the output solenoid valve 20, since for this value the infrastructure 1 is in any case kept in safety condition.

The exemplary representations shown by way of example in FIGS. 5A and 5B relate only to portions of the data packet PD relative to the Modbus protocol PDU and to the PDU header related to the TCP/IP protocol, as if the data packet were defined only by said protocols and said fields of the protocols. The complete representation must include all protocols for all the levels and all the fields, and their values, for each protocol. In the same way, the allowable representations have been defined only in relation to the variation of the value of the "value" variable attribute but could be equally defined by multiple allowed protocols and/or the attributes of said protocols and/or values allowed for each attribute, originating an allowed predefined representation for each of the aforementioned elements that is subject to variation.

In the present invention the operation of the apparatus 100 is illustrated when the threshold values have been previously defined and stored within the second storage means 104, but the comparison elements can further be inserted manually by means of an operator interface. For this purpose, the operator can design customized comparison elements according to the infrastructure to be controlled or one or more parameters characterizing the same. Furthermore, it is possible to define comparison elements such as parts of the virtualized infrastructure, i.e. representing the only nodes allowed in the telecommunication system, the possible arcs to direct the communication, the allowed protocols, the fields allowed for each protocol and the values allowed for each field of the protocols. Likewise, the operator can exclude one or more of the aforementioned elements, or combinations thereof, from the admissible representation(s), which are not compatible with the correct operation of the infrastructure to be monitored.

In a preferred embodiment, the second storage means 104 allow to keep within the memory one or more of the above allowed predefined representations, in particular storing them on non-volatile supports.

Finally, in a further step of signalling an anomaly of the infrastructure 1, it is carried out by means of the computerized data processing means 102 when at least one of the critical states is identified in the generated and stored virtual representation. The anomaly detection apparatus 100 according to the present invention therefore allows to compare each of the virtual representations of the infrastructure 1 with the defined critical states, identifying problems due to the presence of critical states within the virtual representations. For example, in the infrastructure 1, an anomaly can occur in the event that the actuators 10, 20, or the solenoid valves, stop operating correctly generating an operation activity at least potentially risky for the pressure increase in the duct 30, for example a data packet PD characterized by the following fields: Protocol=Modbus; Function code=Write; ID=2; IR=1; Value=0, corresponding to a value of the variable attribute corresponding to the section of the fluid passage through the output solenoid valve 20 equal to 0, i.e. closed. Likewise, an anomaly may arise in the event of an intrusion or attack by a third party through an illegal entry into the telecommunication system or the use of malwares in one or more nodes constituted by the logic controllers 12, 22, 32 or from the supervision unit 54 or using a different communication protocol, such as the use of a DNP3 protocol instead of the Modbus.

Therefore, in the case of a positive critical issue evaluation, the apparatus 100 is able to signal the presence of an anomaly of the industrial infrastructure 1 to a possible operator, by means of an appropriate graphic interface or a human-machine interface (HMI).

In the aforesaid embodiment, all the components constituting the detection apparatus 100 are made of components which are discrete and operationally connected to each other as described. In alternative embodiments, some components may be defined by a single structure instead or still be parts external of the apparatus 100 itself, albeit operationally connected thereto.

Examples of such different embodiments are shown below. The network analyser and the data processing means could, for example, be made from a single device, thus allowing greater speed in processing the virtual representations of the system. Likewise, also the first and second storage means could be realized by a single device, for example by partitioning a single storage device and by allocating the corresponding partitions to the two different uses. Finally, a single device could comprise one or more of the aforementioned elements, e.g. allowing a considerable reduction in wiring.

The apparatus 100 according to the present invention is preferably also used in a learning step, prior to the operating step previously described and in which it is used for signalling possible anomalies. In the aforementioned learning step, or step of defining the critical states, the critical states are defined, or mutatis mutandis are defined those that are the non-critical states, and the network analyser 101 performs the same function described above by analysing each data packet that transits in the telecommunication system and identifying the protocols used and at least one field of the aforesaid protocols for each data packet, preferably all the network protocols used and all the fields of each of the protocols.

A peculiar characteristic of the learning step is the definition of a time interval within which to perform the aforementioned steps, i.e. the analysed and identified data packets are only those generated in the aforementioned predefined time interval. The value of the time interval can be defined by the user depending on the type of infrastructure to be controlled and/or in functions of other variables such as the communication frequency, and therefore the generation of data packets, or even the number of actuators or sensors present. By increasing the value of the time interval, it will be possible to carry out the steps of analysing and identifying a greater number of data packets, thus increasing the ability of the apparatus 100 to identify and define possible anomalies.

Following the step of identifying the protocols used for each data packet and at least one field of the aforesaid protocols, the step of generating an aggregate virtual representation of the infrastructure 1 is carried out by means of computerized data processing means. Such aggregate virtual representation is performed on the basis of the protocols and fields of the protocols identified with each data packet exchanged in the predetermined time interval.

The aggregate virtual representation therefore corresponds to the set of information characterizing the infrastructure 1 and which have been transited in the telecommunication system.

Figure 5C:
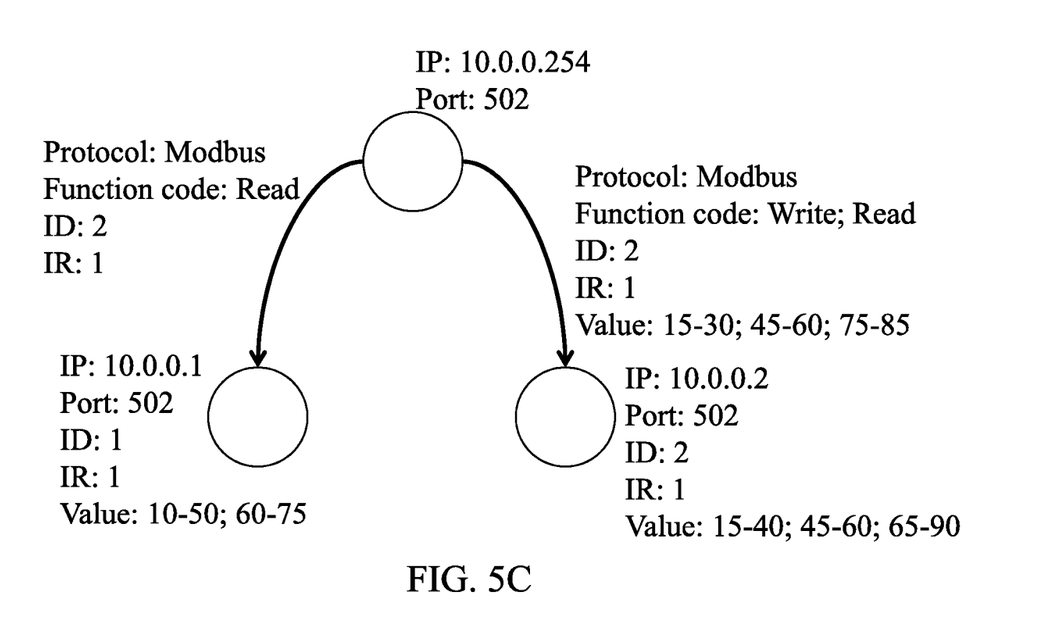
FIG. 5C illustrates a schematic view of an aggregate virtual representation obtained in the learning step or in the step of defining the critical states.

A representation of the aforesaid type is shown, by way of example, in FIG. 5C. In this representation it is assumed that in a predetermined time, for example equal to 12 hours, multiple data packets PD transmitted with the features described below have been transited in the telecommunication system. On the arc defined between the supervision unit 52 and the logic controller 12 connected to the input solenoid valve 10, only data packets PD characterized by the following fields are transmitted: Protocol=Modbus; Function code=Read; ID=1; IR=1. In fact, the logic controller received only requests to read the value of the variable attribute assumed by the input solenoid valve 10. The node corresponding to the input solenoid valve 10 has assumed variable attribute values, defined by the Value field, equal to 10-50; 60-75. On the arc defined between the supervision unit 52 and the logic controller 22 connected to the output solenoid valve 20, only data packets PD characterized by the following fields are transited: Protocol=Modbus; Function code=Read; ID=2; IR=1 e Protocol=Modbus; Function code=Write; ID=2; IR=1; Value=15-30; 45-60; 75-85. In fact, the logic controller received requests to read the value of the variable attribute assumed by the output solenoid valve 20, but also requests for the setting of the aforesaid variable attribute, with values assumed in the range of values 15-30; 45-60; 75-85. The node corresponding to the output solenoid valve 20 has assumed variable attribute values, defined by the Value field, equal to 10-40; 45-60; 65-90. Finally, since there has been no exchange of data packet PD between the supervision unit 52 and the logic controller 32 not connected to any actuator and/or sensor of the infrastructure, there is no representation of the aforementioned logic controller 32 in the aggregate virtual representation of FIG. 5C.

A further step of storing the aggregate virtual representation, for example according to what is shown in FIG. 5C, is memorized in the second storage means 104 allowing to keep it within the memory on non-volatile supports. Such aggregate virtual representation therefore corresponds to multiple allowable representations and thus the subsequent step of identifying the critical states is carried out by the complement of the previous aggregate virtual representation, or by identifying the virtual representations not included in the aggregate virtual representation as critical states.

Preferably, the learning step is realized when the infrastructure 1 is not connected to the network and during standard operation, thereby minimizing the possibility of interference from the outside and allowing to identify the aggregate virtual representation relative to the states assumed by the infrastructure 1 when under normal operating conditions.

After the learning step, the anomaly detection apparatus 100 continues to operate by analysing each data packet PD exchanged in the telecommunication system to identify any critical states, following the method for detecting anomalies of the infrastructure 1, according to the previous description. Thus, a critical state would, for example, be identified in the case where one of the exchanged data packets PD was characterized by the following fields: Protocol Modbus; Function code=Read; ID=3; IR=1. Such representation corresponds to querying the physical state of the components connected to the logic controller 32 which, as previously described, is not operatively connected to any sensor and/or actuator and therefore generates an anomaly, that is a critical state, with respect to what detected in the learning step. Likewise, a critical state would be identified in the case wherein one of the exchanged data packets PD was characterized by the following fields: Protocol=Modbus; Function code=Write; ID=1; IR=1; Value=91: such representation corresponds to the setting of the physical state of the input solenoid valve 10 to a value equal to 91, previously not identified during the learning step. Even more, a critical state would, for example, be identified in the case wherein one of the exchanged data packets PD was characterized by the following fields: Protocol=DNP3; Function code=Write; ID=1; IR=1; Value=60. Such representation, unlike the previous one, corresponds to a correct setting of the physical state of the input solenoid valve 10 to a value equal to 60, thus falling within the values already identified during the learning step, but by using an incorrect protocol, since it has never been identified during the learning step.

Therefore, the anomaly detection apparatus 100 allows to compare each of the subsequent virtual representations of the infrastructure 1 with the defined allowable representations, identifying possible discrepancies. In the case of a positive critical issue evaluation, the apparatus 100 thus signals the presence of an anomaly of said infrastructure 1 to a possible operator, by means of an appropriate graphic interface or a human-machine interface (HMI).

According to a further embodiment, the comparison step further comprises the comparison of two or more of virtual representations generated in succession. In such case, the comparison step identifies at least one critical state of the infrastructure in the differences between the subsequent virtual representations and the comparison elements. For such purpose, the computerized data processing means of the apparatus according to the present invention, in use, compares two or more successive virtual representations. The same computerized data processing means identify and signal at least one critical state of the infrastructure in the differences between the subsequent virtual representations and comparison elements.

In such case, a critical state could be generated by evaluating only the differences between two subsequent virtual representations. For example, the setting of the value relating to the physical state of the input valve 10 can be made to values falling within the ranges of admissible values as in the learning step, but a critical state could still be generated if in the evaluation of the differences between two virtual representations connected to this setting, the difference between the aforementioned values relating to the physical state of the valve was too high.

Still according to a further embodiment, the comparison elements may comprise threshold values of the communication frequencies between two or more of the subsequent virtual representations, in such case, the comparison step further comprises comparing two or more of the virtual representations generated in succession identifying the communication frequency between the logic controllers and/or between the logic controllers and the sensors or actuators and/or between the logic controllers and the supervision unit. In this regard, the critical states are identified by threshold values for the communication frequencies. For this purpose, the network analyser is adapted to identify the communication frequency between the logic controllers and/or between the logic controllers and the sensors or actuators and/or between the logic controllers and the supervision unit, and wherein the comparison elements comprise threshold values for the communication frequencies. At the same time, the computerized data processing means identify at least one of the critical states when at least one threshold value of the detected communication frequencies is exceeded.

For example, a succession of data packets PD could set the physical state of the input solenoid valve 10 to subsequent decreasing values, therefore technically acceptable for the state of the infrastructure 1. A critical state could however be identified if the frequency with which the abovementioned value of the physical state is modified, i.e. the frequency of the relative data packets PD, is too high, for example higher than a predefined value. Such critical state may arise from the fact that the physical process of the infrastructure 1 does not have a reaction/adaptation time such as to correctly follow the change requests.

According to a further aspect, the method may comprise the step of comparing two or more of the virtual representations generated in succession and identifying one or more communication sequences between the logic controllers and/or between the logic controllers and the supervision unit and/or between the logic controllers and the sensors or actuators. In such case, critical states comprise non-allowable communication sequences. For this purpose, the computerized data processing means, in use, compare two or more of the virtual representations generated in succession and identify one or more communication sequences between the logic controllers and/or between the logic controllers and the supervision unit and/or between the logic controllers and the sensors or actuators, and wherein the comparison elements comprise non-allowable communication sequences. Therefore, the computerized data processing means identifies at least one of the critical states when at least one identified communication sequence corresponds to a non-allowable communication sequence.

The evaluation of the sequence could correspond to the evaluation of the correlation between the variables to be evaluated, for example relating to the physical state of the input solenoid valve 10 and of the output solenoid valve 20. For example, a sequence may generate a critical state in which the physical state value of the output solenoid valve 20 is first set as decreasing and then the physical state value of the input solenoid valve 10 is subsequently se as increasing.

Preferably, the method further comprises the step of defining risk values for each of the sensors and/or actuators and/or supervision unit and/or value and/or communication protocol and/or protocol field, the risk values being stored on the first or second storage means, wherein the step of generating the virtual representation comprises the additional step of associating the risk values to each virtual representation, generating a virtual representation of risk.

It is possible to identify a risk for each component or calculate a single risk for components connected to the same logic controller or to the same supervision unit. For example, the risk identification may comprise the assignment of values from 1 to 10, wherein increasing values correspond to an increasing risk, where the risk calculation for a logic controller or supervision unit may be performed by identifying the maximum risk value of the elements connected to the same.

The method further comprises the step of automatically calculating the risk values, by means of computerized data processing means, on the basis of the communication frequency between the industrial components and/or between the supervision units and/or between the industrial components and the supervision units and/or based on the value of the variable attributes and/or protocol used and/or protocol attributes identified by the network analyser.

The automatic calculation of the risk values is carried out, preferably, by means of machine learning techniques, for example by evaluating the complexity of the code inside the logic controller or the supervision unit, by evaluating the number of MTUs connected to the single logic controller.

The invention claimed is:

1. A method for detecting anomalies in a physical infrastructure (1) provided with:
    one or more actuators (10, 20) and/or sensors electrically connected to one or more logic controllers (12, 22, 32), wherein said logic controllers (12, 22, 32) control, in use, the values of the variable attributes relating to the physical state of the actuators (10, 20) and/or sensors;
    at least one supervision unit (52) of said logic controllers (12, 22, 32);
    a telecommunication system between said logic controllers and/or between said supervision unit (52) and said logic controllers (12, 22, 32), said telecommunication system being able to exchange data packets (PD) comprising said values of the variable attributes relating to the physical state by means of network communication protocols;
    said method comprising:
    analysing, through a network analyser (101) connected to said telecommunication system, each of said data packets (PD) exchanged in said telecommunication system;
    identifying, through said network analyser (101), for each of said analysed data packets (PD) all the network protocols used and all the fields of each of said protocols;
    generating, through computerized data processing (102), a virtual representation of said infrastructure (1) for each of said exchanged data packets (PD) and on the basis of the identified protocols and fields;
    storing, in a first volatile storage (103), said virtual representation generated for each of said exchanged data packets (PD);
    comparing, through said computerized data processing means, said virtual representation stored with at least one comparison element, identifying at least one critical state of said infrastructure from the differences and/or similarities between said stored virtual representation and said comparison elements;
    signaling, through said computerized data processing means, an anomaly of said infrastructure when at least one of said critical states is identified in said virtual representation
    wherein said comparing further comprises the comparison of two or more of said virtual representations generated in succession identifying one or more communication sequences and the communication frequency between said logic controllers and/or between said logic controllers and said sensors or actuators and/or between said logic controllers and said supervision unit,
    wherein said comparing identifies at least one critical state of said infrastructure in the differences between said subsequent virtual representations and said comparison elements,
    wherein said comparison elements comprise non-allowable communication sequences and threshold values for the communication frequencies between two or more of said subsequent virtual representations, and
    wherein said critical states are identified when at least one identified communication sequence corresponds to a non-allowable communication sequence and when at least one threshold value of the detected communication frequencies is exceeded.

2. The method according to claim 1, wherein said comparison elements comprise one or more allowed predefined representations of said infrastructure, and
    wherein said comparing identifies at least one of said critical states when said stored virtual representation is different from said allowed predefined representations.

3. The method according to claim 1, wherein said comparison elements comprise one or more thresholds of said values of the variable attributes relating to the physical state of said actuators and/or sensors, and
    wherein said comparing identifies at least one of said critical states when at least one of said values of said stored virtual representation exceeds the relative threshold.

4. The method according to claim 1, wherein said comparison elements comprise one or more communication protocols not allowed for said network communication, and
    wherein said comparing identifies at least one of said critical states when said stored virtual representation comprises one or more communication protocols not allowed for said network communication.

5. The method according to claim 1, wherein said comparison elements comprise one or more fields not allowed for said communication protocols, and
    wherein said comparing identifies at least one of said critical states when said stored virtual representation comprises one or more of the fields not allowed for said communication protocols.

6. The method according to claim 1, wherein before said comparing said method comprises the defining of said critical states, wherein said defining of said critical states comprising:
    analyzing, by said network analyser connected to said telecommunication system, each of said data packets exchanged in a predetermined time interval;
    identifying, by said network analyser, for each of said analysed data packet, the network protocols used and all the fields of said protocols;
    generating, through said computerized data processing means, an aggregate virtual representation of said infrastructure in said predetermined time interval based on said protocols and fields of said protocols identified with each exchanged data packet;

storing, in second storage means of the permanent type, said aggregate virtual representation;

identifying said critical states as virtual representations not comprised in said aggregate virtual representation.

7. The method according to claim 1, wherein said method further comprises the defining of risk values for each of said sensors and/or actuators and/or supervision unit and/or value and/or communication protocol and/or protocol field, said risk values being stored on said first or second storage means, wherein said generating the virtual representations comprises the further associating of said risk values to each of the virtual representations, generating a virtual representation of risk.

8. The method according to claim 1, wherein said method further comprises the automatically calculating of said risk values, by means of said computerized data processing means, on the basis of the communication frequency between said industrial components and/or between said supervision units and/or between said industrial components and said supervision units and/or based on said value of the variable attributes and/or protocol used and/or attributes of said identified protocol by said network analyser.

9. The method according to claim 1, wherein said data packets (PD) comprise at least one protocol field relating to the sender address and at least one protocol field relating to the recipient address, and wherein said virtual representation generated for each of said analysed data packets (PD) is obtained by defining said fields related to said addresses as nodes, the connections between said sender and said recipient as arcs and the remaining fields extracted from said data packets as values of said nodes and arcs.

10. An apparatus (100) for detecting anomalies in an infrastructure (1) provided with:

one or more actuators (10, 20) and/or sensors operatively connected to one or more logic controllers (12, 22, 32), wherein said logic controllers (12, 22, 32) control, in use, values of the variable attributes relating to the physical state of said actuators and/or sensors;

at least one supervision unit (52) of said logic controllers (12, 22, 32);

a telecommunication system between said logic controllers and/or said supervision unit (52) and said logic controllers (12, 22, 32), said telecommunication system being able to exchange data packets (PD) comprising said values of the variable attributes of the physical state by means of network communication protocols;

said apparatus (100) for detecting anomalies comprising:

a network analyser (101) to be connected to said telecommunication system, wherein said network analyser (101) analysing each of said data packets (PD) exchanged in said telecommunication system and identifying the network protocol used for each of said data packets (PD) and all the fields of said protocol;

computerized data processing means (102) operatively connected to said network analyser (101), said computerized data processing means (102) generating a virtual representation of said infrastructure (1) on the basis of said protocols and fields of said protocols identified by said network analyser (101) to each exchanged data packet (PD);

first volatile storage means (103) operatively connected to said computerized means (102), said first storage means (103) storing said virtual representation generated for each exchanged data packet (PD);

second permanent storage means (104) operatively connected to said computerized means (102), said second storage means (104) comprising in their memory one or more comparison elements;

wherein said computerized data processing means, in use, comparing said virtual representation with at least one of said comparison elements, and wherein the computerized data processing means identifying and signaling at least one critical state of said infrastructure from the differences and/or similarities between said stored virtual representation and said comparison elements, wherein said computerized data processing means, in use, comparing two or more subsequent virtual representations identifying one or more communication sequences and the communication frequency between said logic controllers and/or between said logic controllers and said sensors or actuators and/or between said logic controllers and said supervision unit, wherein said computerized data processing means identifying and signaling at least one critical state of said infrastructure in the differences and/or similarities between said subsequent virtual representations and said comparison elements, wherein said comparison elements comprise non-allowable communication sequences and threshold values for the communication frequencies between two or more of said subsequent virtual representations, and wherein said computerized data processing means identifying at least one of said critical states when at least one identified communication sequence corresponds to a non-allowable communication sequence and when at least one threshold value of the detected communication frequencies is exceeded.

* * * * *